Aug. 15, 1972   H. FRIELINGSDORF ET AL   3,684,610
METHOD OF PRODUCING METAL-CLAD PLASTIC PANELS
Filed Aug. 26, 1969
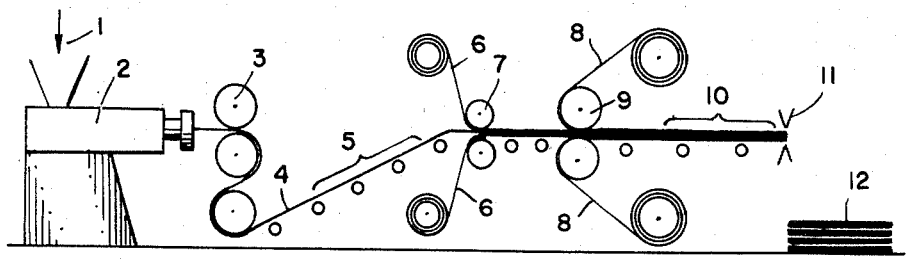
INVENTORS:
HANS FRIELINGSDORF
HEINZ MUELLER - TAMM
DIETER MAHLING
BY
ATT'YS 3,684,610
METHOD OF PRODUCING METAL-CLAD
PLASTIC PANELS
Hans Frielingsdorf, Bad Durkheim, Heinz Mueller-Tamm, Ludwigshafen, and Dieter Mahling, Neuleiningen, Germany, assignors to Badische Anilin- & Soda-Fabrik Aktiengesellschaft, Ludwigshafen (Rhine), Germany
Filed Aug. 26, 1969, Ser. No. 853,126
Claims priority, application Germany, Aug. 27, 1968,
P 17 79 554.9
Int. Cl. B29d 7/02; B32b 15/08
U.S. Cl. 156—244                         6 Claims

ABSTRACT OF THE DISCLOSURE

A process for the production of sandwich constructions consisting of (a) an inner ply of polyethylene; (b) adhesion-promoting interlayers applied to both sides of the inner ply and (c) outer plies of metal applied to the two interlayers. It is a characteristic feature of the invention that sheeting is prepared continuously from a special polyethylene by means of a screw extruder at a specific temperature of the material, this sheeting is covered on both sides with a film of a special terpolymer by means of a pair of rollers, the resultant laminate is then covered continuously by means of a pair of rollers at a specific temperature of the material with metal sheeting having a specific temperature and the whole is combined to form a sandwich panel under a specific roller pressure. The process gives sandwich constructions having particularly good chemical and physical properties in a simple way.

---

The present invention relates to a process for the production of flat structural sandwich constructions consisting of (a) a relatively thick inner ply of thermoplastic;
(b) relatively thin adhesion-promoting interlayers firmly applied to both sides of the inner ply; and
(c) relatively thin outer plies of a metal firmly attached to the two interlayers.

In known methods of this type, the sandwich panels are prepared using for example an extrusion coating plant. In these methods a board of polyethylene (used as the relatively thick inner ply) first has applied to it a substance promoting adhesion between the polyethylene and the metal outer plies. This adhesion promoter (or bonding agent) is either a contact adhesive or a two-component adhesive based on an epoxide.

The said methods have the disadvantage that they are troublesome and that the strength of the bond between metal and plastics (polyethylene) leaves much to be desired. When using contact adhesives, only low creep rupture strengths and inadequate resistance to high temperatures are achieved. On the other hand the production of the bond by means of two-component adhesives necessitates the use of elaborate equipment and long curing periods and gives fairly brittle bonds; moreover the resultant sandwich panels are not capable of being deep-drawn. Furthermore, in order to obtain a fairly good bond it has hitherto always been necessary to pretreat the metal and polyethylene surfaces to be bonded, for example oxidatively.

The present invention has for its object to provide a process of the type described above which does not have the said disadvantages or has them to a far smaller extent.

We have found that the said object is achieved when the outer plies of metal are applied by means of a special adhesion-promoting layer under special process conditions to a special type of polyethylene (used as the relatively thick inner ply).

The present invention comprises a process of the type referred to above wherein sheeting having a thickness of from 1 to 20 mm., preferably from 2 to 8 mm., is continuously prepared by means of a screw extruder at a temperature of the material of from 120° to 220° C., preferably from 160° to 180° C., from a polyethylene having a density of from 0.918 to 0.930 g./cm.$^3$ and a melt index (according to ASTM D 1238–65 T) of from 0.2 to 5, the sheeting thus obtained is continuously covered on both sides by means of a pair of rollers with a film having a thickness of from 0.01 to 0.2 mm., preferably from 0.05 to 0.1 mm., of a terpolymer containing 60 to 90% by weight of ethylene units, 0.5 to 20% by weight of units of an ethylenically unsaturated carboxylic acid and 0.5 to 20% by weight of units of an ester of an ethylenically unsaturated carboxylic acid, the laminate thus obtained is then continuously covered on both sides by means of a pair of rollers at a temperature of the laminate of from 20° to 100° C., preferably from 20° to 60° C., with metal sheeting having a thickness of from 0.05 to 2.5 mm., preferably from 0.1 to 0.8 mm., and a temperature of from 100° to 250° C., preferably from 160° to 200° C., the whole is bonded together to form a sandwich construction under a roller pressure of from 5 to 50 kp./cm., the product thus obtained is brought to a temperature of less than 60° C. and cut into boards having the desired length.

An advantageous embodiment of the process according to this invention comprises using a film of a terpolymer which contains 71 to 90% by weight of ethylene units, 3 to 9% by weight of units of an aliphatic ethylenically unsaturated $C_3$ to $C_5$ carboxylic acid and 1 to 20% by weight of units of a $C_1$ to $C_8$ alkyl ester of an aliphatic ethylenically unsaturated $C_3$ to $C_5$ carboxylic acid.

A particularly advantageous embodiment of the process according to this invention comprises using a film of a terpolymer which contains 71 to 90% by weight of ethylene units, 3 to 9% by weight of acrylic acid units and 1 to 20% by weight of tertiary-butyl acrylate units.

Commercial polyethylene having a density of from 0.918 to 0.930 g./cm.$^3$ and a melt index of from 0.2 to 5 is suitable for carrying out the process according to the invention. The adhesive film consists of a known terpolymer which can be processed into film by methods conventionally used for ethylene polymers. It is advantageous for the terpolymer used to have the following characteristic data: density=0.9 to 1.1 g./cm.$^3$; crystalline fraction less than 60%; melting range from 70° to 120° C.; Shore Hardness C=50 to 90. Conventional metal sheeting is suitable; for example sheeting of aluminum, copper, brass and steel has proved to be suitable.

Production of the flat structural sandwich constructions may be carried out by means of conventional equipment for manufacturing plastics panels at a production rate of up to 2.5 meters per minute. This equipment may in the present case advantageously consist for example of a screw extruder, a system of smoothing rolls, a cooling zone, a pair of rollers for covering the polyethylene sheeting with the terpolymer film, a pair of rollers for covering the laminate with the metal sheeting and for sandwich bonding, a cooling zone and cutting means.

In the accompanying drawing, 1 denotes polyethylene granules, 2 a screw extruder, 3 a system of smoothing rolls, 4 polyethylene sheeting, 5 a cooling zone, 6 a terpolymer film, 7 a pair of rollers, 8 metal sheeting, 9 a pair of rollers, 10 a cooling zone, 11 a cutting means and 12 sandwich constructions.

The invention is illustrated by the following example.

EXAMPLE

Sheeting having a thickness of 3 mm. is prepared continuously from a polyethylene having a density of 0.918 g./cm.$^3$ and a melt index of 1.5 on a screw extruder having a 90 mm. screw and a sheeting die 600 mm. in width, after which the sheeting is smoothed and brought to a temperature of about 60° C. The sheeting is then continuously covered on both sides with a film having a thickness of 0.1 mm. of a terpolymer made from 88% by weight of ethylene, 2.7% by weight of acrylic acid and 9.3% by weight of tertiary-butyl acrylate. The laminate obtained is continuously covered on both sides with aluminum sheeting having a temperature of 190° C. by means of a pair of rollers having a temperature of 190° C., the temperature of the laminate being about 60° C. The whole is combined into a sandwich construction under a roller pressure of about 20 kg. per cm., brought to about 40° C. and cut up into panels. The output of the screw extruder is about 180 kg. of polyethylene per hour. The corresponding production rate is 1.6 meters per minute.

What we claim is:

1. A process for the production of flat structural sandwich constructions consisting of (a) a thick inner ply of thermoplastic, (b) thin adhesion-promoting interlayers firmly applied to both sides of the inner ply and (c) thin outer plies of a metal firmly applied to the two interlayers, which comprises extruding polyethylene sheeting having a thickness of from 1 to 20 mm. at a temperature of the extrudate of from 120° to 220° C., said polyethylene having a density of from 0.918 to 0.930 g./cm.$^3$ and a melt index, according to ASTM D 1238-65 T, of from 0.2 to 5, cooling the extruded polyethylene sheeting to a temperature of 20-100° C., continuously covering the sheeting thus obtained on both sides between a pair of rollers with a preformed film having a thickness of from 0.01 to 0.2 mm. of a terpolymer containing 60 to 90% by weight of ethylene units, 0.5 to 20% by weight of units of an ethylenically unsaturated carboxylic acid and 0.5 to 20% by weight of an ester of an ethylenically unsaturated carboxylic acid, continuously covering the laminate thus obtained on both sides between a pair of rollers at a temperature of the laminate of from 20° to 100° C. with metal sheeting having a thickness of from 0.05 to 2.5 mm. and a temperature of from 160–200° C., subjecting the resultant five-ply sandwich construction to a roller pressure of from 5 to 50 kp./cm., bringing the roller-pressed sandwich construction to a temperature of less than 60° C., and cutting it into boards having the desired dimensions.

2. A process as claimed in claim 1 wherein a film of a terpolymer is used which contains 71 to 90% by weight of ethylene units, 3 to 9% by weight of units of an aliphatic ethylenically unsaturated $C_3$ to $C_5$ carboxylic acid and 1 to 20% by weight of units of a $C_1$ to $C_8$ alkyl ester of an aliphatic ethylenically unsaturated $C_3$ to $C_5$ carboxylic acid.

3. A process as claimed in claim 1 wherein a film of a terpolymer is used which contains 71 to 90% by weight of ethylene units, 3 to 9% by weight of acrylic acid units and 1 to 20% by weight of tertiary-butyl acrylate units.

4. A process as claimed in claim 1 wherein the polyethylene sheeting has a thickness of 2 to 8 mm., the temperature of the material in the extruder is from 160° to 180° C., and the terpolymer film has a thickness of from 0.05 to 0.1 mm.

5. A process as claimed in claim 1 wherein the metal sheeting has a thickness of from 0.1 to 0.8 mm. and the temperature of the laminate to which it is applied is from 20° to 60° C.

6. A process as claimed in claim 1 wherein the terpolymer has the following characteristic data: density=0.9 to 1.1 g./cm.$^3$; crystalline fraction less than 60%; melting range from 70° to 120° C.; Shore Hardness C=50 to 90.

References Cited

UNITED STATES PATENTS

| | | | |
|---|---|---|---|
| 2,726,979 | 12/1955 | Grant | 156—313 |
| 3,043,716 | 7/1962 | Busse et al. | 156—244 |
| 3,054,703 | 9/1962 | Brasure | 156—309 |
| 3,140,196 | 7/1964 | Lacy et al. | 156—244 |
| 3,152,029 | 10/1964 | Orloff | 156—313 |
| 3,318,758 | 5/1967 | Tell | 156—272 |
| 3,323,965 | 6/1967 | Hanle et al. | 156—272 |
| 3,484,339 | 12/1969 | Caldwell | 161—214 |
| 3,249,570 | 5/1966 | Potts et al. | 260—80.8 |
| 3,311,862 | 3/1967 | Rees | 156—309 |

CARL D. QUARFORTH, Primary Examiner

E. E. LEHMANN, Assistant Examiner

U.S. Cl. X.R.

156—269, 285, 309, 321, 332; 161—214